United States Patent [19]

Lee et al.

[11] Patent Number: 4,948,955
[45] Date of Patent: Aug. 14, 1990

[54] BARCODE LOCATION DETERMINATION

[75] Inventors: Shih-Jong J. Lee, Bellevue; Robert C. Wang, Redmond, both of Wash.

[73] Assignee: The Boeing Company, Seattle, Wash.

[21] Appl. No.: 289,662

[22] Filed: Dec. 22, 1988

[51] Int. Cl.$^5$ .............................................. G06K 7/10
[52] U.S. Cl. ..................................... 235/462; 235/463
[58] Field of Search ................................ 235/462, 463

[56] References Cited

U.S. PATENT DOCUMENTS 4,096,992  6/1978  Nojiri ................................... 235/462

Primary Examiner—Harold I. Pitts
Attorney, Agent, or Firm—John R. Mugno

[57] ABSTRACT

A method of determining the location of a barcode block comprising the steps of reducing an input image, rejecting background clutter, detecting barcode regions, extracting barcode moment-based features, and determining four corner points of said barcode block. This method of determining the location of a barcode block can be implemented in a single PC card and achieve a throughput of more than 16 documents per second.

27 Claims, 2 Drawing Sheets

BARCODE LOCATION DETERMINATION

BACKGROUND OF THE INVENTION

This invention relates to barcode detection systems and, in particular, to a method of accurately determining the location of a barcode on a document.

Barcode systems have attained widespread use as a means of identifying products. They are utilized in vastly diverse applications ranging from supermarket check-out lines to factory production lines.

In order to successfully read a barcode, it must be properly located. This task is made more difficult due to random orientation and position of barcodes on a document. Barcode location is most efficiently determined by reference to the four corner points of the barcode. Location accuracy of these four corner points must be precise enough to allow accurate barcode reading by a "barcode read" technique such as the technique described in the co-pending application Ser. No. 07/289,663 filed Dec. 22, 1988, entitled "Barcode Recognition From A Known Location" by Edward W. Connell and Shih-Jong James Lee.

A practical method of determining the location of a barcode should possess an algorithm suitable to implementation in a single PC card and achieve a throughput of more than 16 documents per second. A throughput of more than 16 documents per second should be achieved regardless of size, quality, and content of the background document.

SUMMARY OF THE INVENTION

It is, therefore, an object of the present invention to provide a new and improved method of determining the location of a barcode.

It is further an object of the present invention to provide a new and improved method of accurately determining the four corner points of a barcode.

It is an additional object of the present invention to provide a new and improved method of accurately determining the location of a barcode which requires no key features other than clusters of bars.

It is still a further object of the present invention to provide a new and improved method of accurately determining the location of a barcode which utilizes an algorithm suitable for implementation in a single PC card.

It is still a further object of the present invention to provide a new and improved method of accurately determining the location of a barcode wherein said method is capable of a throughput of more than 16 documents per second.

These and other objects and advantages of the present invention are achieved by a five step process. The first step of this process is to reduce the data volume of an input image by down-sampling the image into coarse resolution. The second step of the process is to remove background clutter from the down-sampled image. The third step is to detect barcodes from the down-sampled image. The fourth step utilizes an algorithm to detect connected components within the down-sampled image, and also extracts associated moment-based features such as centroid location, area, major axis length, and minor axis length. The final step of the process utilizes the moment-based features extracted in the previous step to determine the four corner points of a barcode.

The objects and advantages described above will become apparent to those skilled in the art upon consideration of the accompanying specification and drawings.

BRIEF DESCRIPTION OF THE DRAWINGS

The above-mentioned and other features and objects of the present invention and the manner of attaining them will become apparent and the invention itself will be best understood by reference to the following description of an embodiment of the invention taken in conjunction with the accompanying drawings, wherein.

DESCRIPTION OF THE PREFERRED EMBODIMENT

Figure 1:
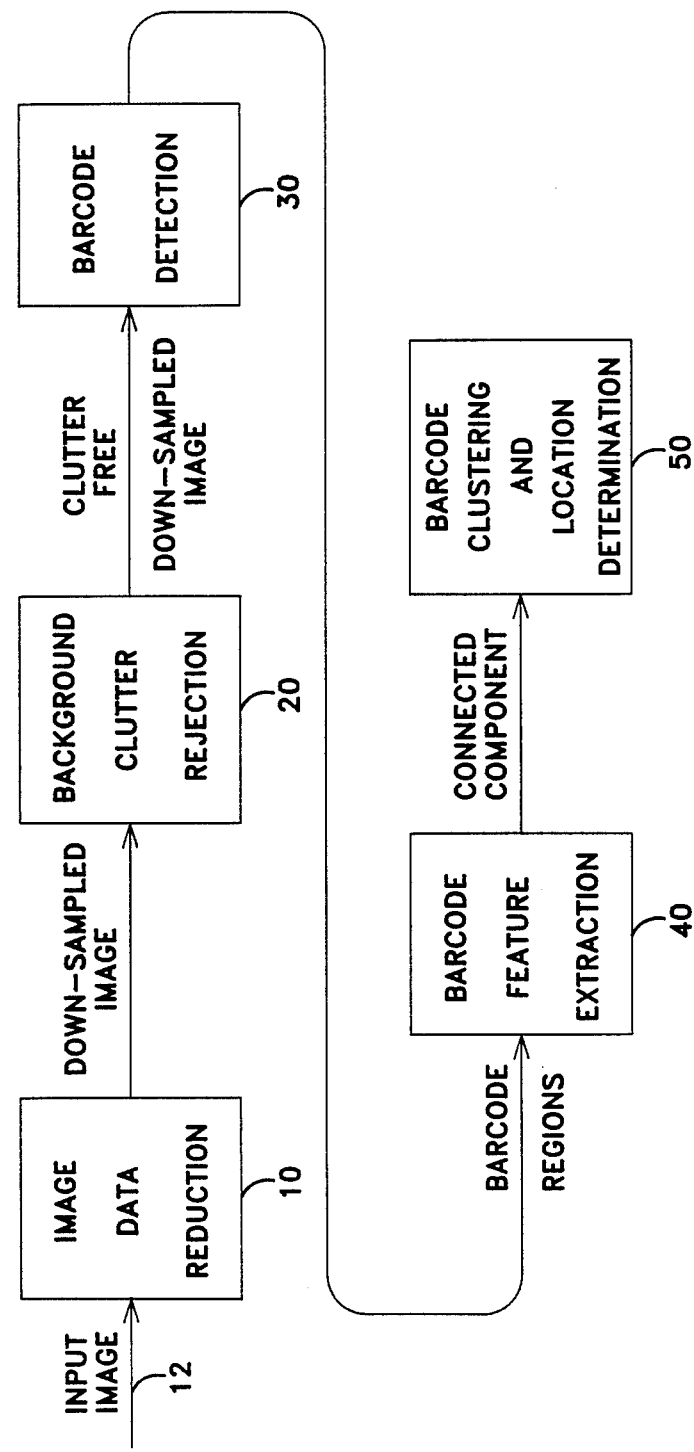
FIG. 1 is a block diagram representing a flow chart of the steps utilized in the present invention.

Referring specifically to FIG. 1, an input line 12 is shown. An input image from a scanned document is fed along input line 12. This input image usually has a high data volume. An input data reduction stage 10 is used to reduce the data volume of the input image by down-sampling the input image into coarse resolution. A commonly used reduction ratio is four to one in both image dimensions for an overall data reduction of 16 to 1. When performing the reduction ratio mentioned above, input data reduction stage 10 includes a decimation which skips every four pixels and every four lines while averaging over the 4 by 4 windows of the pixels being picked up. Image data reduction stage 10 also performs a thresholding function to convert a down-sampled image into binary bit-map form.

The down-sampled image is then transmitted to background clutter rejection stage 20. Background clutter rejection stage 20 actually consists of two operations. The first operation is to remove large background clutter and the second operation is to remove small background clutter.

The removal of large background clutter is performed by a morphological opening residue operation which uses a large symmetric structuring element such as a disk having a radius of six picture elements. It should be apparent to those skilled in the art that a morphological opening operation is actually a morphological erosion followed by a morphological dilation. Furthermore, those skilled in the art should be aware that a large symmetric structuring element besides a disk may be used.

The removal of small background clutter is performed by a morphological opening operation which utilizes a small symmetric structuring element such as a disk having a radius of two pixel elements. Once again, different symmetric structuring elements may be used in place of the disk having a radius of two picture elements.

Figure 3:
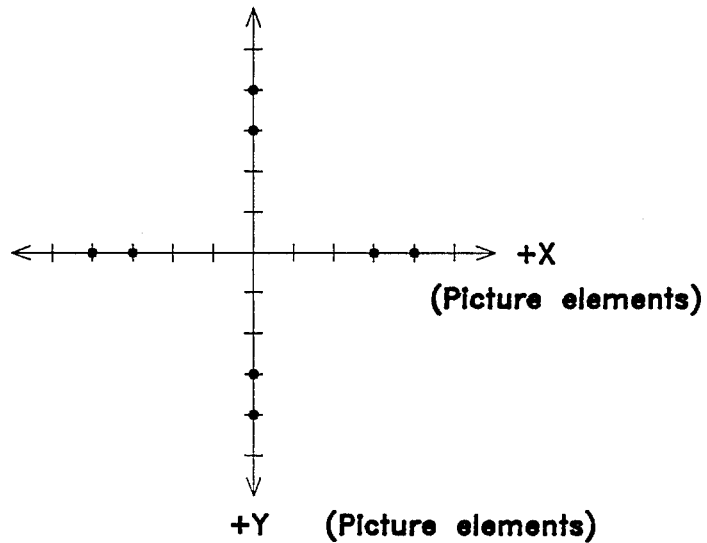
FIG. 3 is an illustration of a special barcode probing structuring element utilized to perform a morphological erosion as implemented in the present invention.

The clutter free, down-sampled image is then transmitted to barcode detection stage 30. Barcode detection stage 30 comprises four operations. First, a morphological erosion is performed by a special barcode probing structuring element in order to detect barcodes at any orientation. An example of the barcode probing structure element used to perform the morphological erosion is illustrated in FIG. 3. The barcode probing structuring element of FIG. 3 contains either points (excluding the origin) which are arranged in a manner which permits the detection of barcodes of any orientation while avoiding picking up background clutter. The positioning of the eight points shown of FIG. 3 may vary depending on the density of a barcode.

The second operation is a morphological dilation by a large structuring element such as a box of fifteen picture elements. This morphological dilation generates a barcode region-of-interest mask. The barcode region-of-interest mask sets an outside parameter for images to be read.

The third operation of barcode detection stage 30 is comparing the barcode region-of-interest mask to barcodes detected by the first operation in order to eliminate image features outside the barcode region-of-interest mask. This third operation is often performed by an AND gate.

The final operation of barcode detection stage 30 is a morphological erosion by a small symmetric structuring element (such as a disk having a radius of one picture element) which separates each bar group into barcode regions. The barcode regions are then operated on by barcode feature extraction stage 40. Barcode feature extraction stage 40 is used to detect both connected components within an image, and also associated moment-based features. These moment-based features may include centroid location, area, major axis length, and minor axis length. Typically, bar components are sorted by their centroid in scan line order.

The connected component moment-based features are then inputted into barcode clustering and location determination stage 50. One important function of barcode clustering and location determination stage 50 is grouping collinear components. Two tests are utilized to perform the grouping of collinear components. The first test is known as the unary test of a component.

The unary test uses known information about the height of a barcode to filter out those components which are either too small or too large. The unary test also compares the length of the major and minor axes of a component to the height of a barcode. The purpose of this comparison is to determine which axis of the component is parallel to the major axis of a barcode. The axis of a component which is parallel to the major axis of a barcode is called the "barcode axis" of the component. If only the length of the major axis is similar to the height of a barcode, then the major axis of this component is assumed to be perpendicular to the major axis of a barcode, and the minor axis of the component is assumed to be the barcode axis because the major and minor axes are perpendicular with each other. Similarly, if only the length of the minor axis is similar to the height of the barcode, then the major axis is assumed to be the barcode axis. If the length of both axes of a component are similar to the height of a barcode, then both axes can be the barcode axes.

The second test utilized to group collinear components is the binary test. The purpose of the binary test is to determine if a component can be merged with a hypothesized barcode block. In order to pass the binary test, three conditions must all be met. The first condition is that the difference between the barcode axis angle of a component and the barcode axis angle of a hypothesized barcode block must be less than a certain threshold T1. It should be noted that the barcode axis angle is defined as the angle between the barcode axis and the X-axis. The second condition is that the shortest distance between the component and the hypothesized barcode block must be less than a certain threshold T2. The final condition is that the perpendicular distance from a centroid of the component to the barcode axis of the hypothesized barcode block must be less than a certain threshold T3.

The binary test described above compares a block and a component. A binary test between two blooks is essentially the same, simply treating the block to be merged as a big component in the binary test. It should also be noted that in situations where both axes of a component can be the barcode axis, a program can be implemented which will assume the minor axis of the barcode axis in the first binary test. In case of failure, the program will then assume the major axis at the barcode axis and run the binary test again.

A hypothesized barcode block is composed of a variable number of components. Initially, a block contained only one component. When a block merges a component or another block, the following computations are performed to update the block:

1. the number of components and list of component identification numbers are updated for the block;

2. a bounding rectangle, which bounds centroids of all the components in the block within rectangle, is updated, with the centroid of the updated block being the center of the updated bounding rectangle. This bounding rectangle has its axes orientated parallel to the X- and Y-axes;

3. the centroids of all the components in a block are used to compute a best fitting line by least means squares (LMS). Two LMS fitting lines are computed, one based on the X-axis and the other based on the Y-axis. (If a long side of the bounding rectangle is parallel to the X-axis, the fitting line based on the X-axis is chosen to represent the new barcode axis of the block, otherwise the fitting line based on the Y-axis is chosen; and 4. the length of the barcode axis of the updated block is computed.

Figure 2:
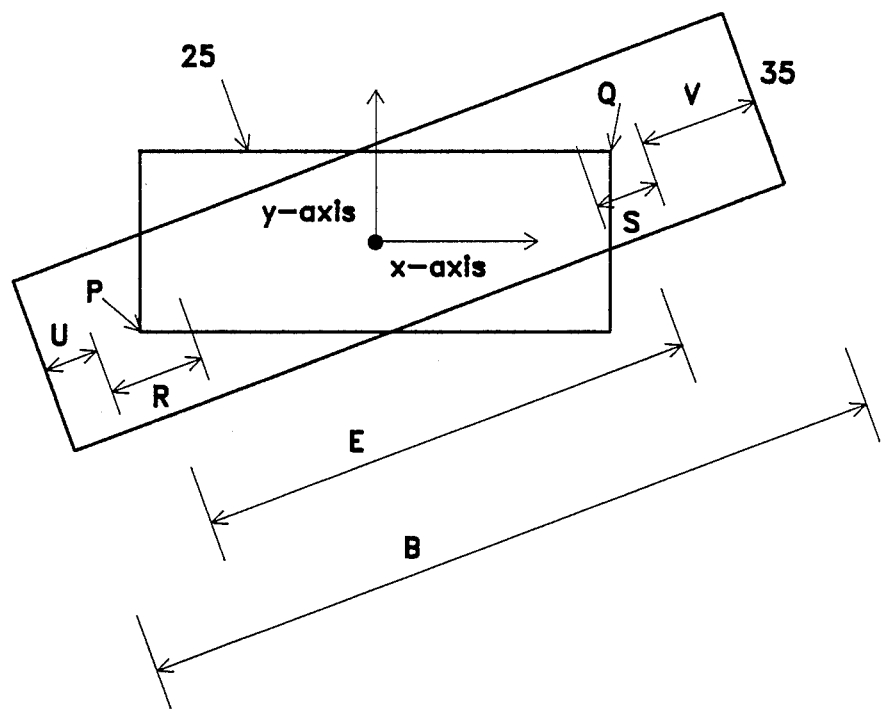
FIG. 2 is an illustration of the method utilized to determine the four corner points of a barcode as disclosed in the present invention.

The computation of determining the length of the barcode axis of the updated block is best understood by referring to FIG. 2. Bounding rectangle 25 intersects the barcode axis at points P and Q. The distance between P and Q is E, the length of the barcode axis of the component containing the point P is R, and the length of the barcode axis of the component containing the point Q is S as illustrated. Therefore, the length of the barcode axis of the upcoded block is $E+(R+S)/2$.

In order to keep track of those components or blocks which have not been merged, barcode clustering and location determination stage 50 maintains two free lists, one for components and the other for blocks. Initially, every component passing the unary test is in the free component list until it is merged into a block. Similarly, every new or updated block is in the free block list until it is merged into another block.

After a barcode is located, the four corner points of a rectangle enclosing the barcode block is determined. This rectangle is called a barcode rectangle and is illustrated in FIG. 2 as reference numeral 35. The long side of barcode rectangle 35 is parallel to the barcode axis of the located barcode block, and the barcode axis divides barcode rectangle 35 into two equal parts. The length of the short side of barcode rectangle 35 is equal to the height of the barcode. The length of barcode rectangle 35, labelled B, is computed by knowing that the difference between length E and length B is equal to B(E+(R+S)/2). This difference value will be called D. D can be seen on FIG. 2 as U+V. A barcode block usually begins and ends with a thin black bar whose width is less than five picture elements. The difference value D results from the fact that the barcode detection state may fail to detect either or both black bars. The value of R and S is used to determine whether D should be added to the estimated barcode lengths to compensate for the undetected black bars.

When R is greater than five picture elements, U equals D; when S is greater than five picture elements, V is equal to D. When R is less than or equal to 5 picture elements, U=0. Similarly when S is less than or equal to 5 picture elements, V=0.

Using the equations above, the length of barcode rectangle 35 is equal to U+E+(R+S)/2+V. Once this length is known, the updated four corner points of a barcode location can be determined.

What has been provided, therefore, is an improved method of determining a barcode regardless of orientation or position. The present invention utilizes the steps of image data reduction, background clutter rejection, barcode detection, barcode feature extraction, barcode clustering and location determination to determine the four corner points of a barcode location. This method is suitable for implementation in a single PC card and can achieve a throughput of more than 16 documents per second even if a given document contains more than one barcode.

While a specific embodiment to this invention has been shown and described, further modifications and improvements will occur to those skilled in the art. For example, certain input images may not require the image data reduction stage of FIG. 1. Thus, although five stages have been described, certain applications may allow for the elimination or combination of various stages. We desire it to be understood, therefore, that this invention is not limited to the particular form shown and we intend to cover all modifications which do not depart from the spirit and scope of the invention.

What is claimed is:

1. A method of determining the location of a barcode block comprising the steps of:
    reducing input image data into a down-sampled image;
    removing background clutter from said down-sampled image thereby creating a clutter-free, down-sampled image;
    detecting barcode regions from said clutter-free, down-sampled image;
    extracting connected, collinear components, along with their associated moment-based features, from said barcode regions; and
    grouping said connected, collinear components into barcode blocks.

2. A method for determining the location of a barcode block as recited in claim 1 wherein said reducing step includes a decimation which skips a predetermined number of pixels and lines.

3. A method for determining the location of a barcode block as recited in claim 2 wherein said reducing step averages selected pixels and then thresholds to convert said down-sampled image into binary bit-map form.

4. A method for determining the location of a barcode block as recited in claim 1 wherein said input image data is operated on by said reducing step to reduce said input image data by a ratio of 4 to 1 in each dimension, thus resulting in an overall 16 to 1 reduction.

5. A method of determining the location of a barcode block as recited in claim 1 wherein said step of removing background clutter comprises a first operation to remove large background clutter, and a second operation to remove small background clutter.

6. A method of determining the location of a barcode block as recited in claim 5 wherein said first operation consists of a morphological opening residue operation by a large symmetric structuring element.

7. A method of determining the location of a barcode block as recited in claim 6 wherein said large symmetric structuring element is a disc with a radius of six picture elements.

8. A method of determining the location of a barcode block as recited in claim 5 wherein said second operation consists of a morphological opening residue operation by a small symmetric structuring element.

9. A method of determining the location of a barcode block as recited in claim 8 wherein said small symmetric structuring element is a disc with a radius of two picture elements.

10. A method of determining the location of a barcode block as recited in claim 1 wherein said step of detecting barcode regions comprises the following sub-steps:
    performing a morphological dilation by a large structuring element to generate a barcode region-of-interest mask;
    eliminating image features outside said barcode region-of-interest mark; and
    performing a second morphological erosion by a small symmetric structuring element to detect said barcode regions.

11. A method of determining the location of a barcode block as recited in claim 10 wherein said large structuring element is a box having sides equal in length to fifteen picture elements.

12. A method of determining the location of a barcode block as recited in claim 10 wherein said small symmetric structuring element is a disk with a radius of one picture element.

13. A method of determining the location of a barcode block as recited in claim 10 wherein said sub-step of eliminating image features outside said barcode region-of-interest mask is performed by an AND gate having a first input supplied by said barcode region-of-interest mask, and a second input supplied by said clutter-free, down-sampled image.

14. A method of determining the location of a barcode block as recited in claim 1 wherein said associated moment-based features include centroid location, area, major axis length, and minor axis length.

15. A method of determining the location of a barcode block as recited in claim 1 wherein said grouping step comprises a unary test and a binary test.

16. A method of determining the location of a barcode block as recited in claim 15 wherein said unary test compares the heights of said connected, collinear components to a known height of a barcode and filters out those components which are either too large or too small as compared to said known height.

17. A method of determining the location of a barcode block as recited in claim 16 wherein said unary test determines the barcode axis of a component.

18. A method of determining the location of a barcode block as recited in claim 15 wherein said binary test determines the length of said barcode block.

19. A method of accurately detecting barcode locations in order to permit accurate barcode reading comprising the steps of:

receiving a digital image of a scanned document as an input;

reducing said input thereby producing a down-sampled image;

rejecting background clutter on said down-sampled image, thereby creating a clutter-free, down-sampled image;

detecting barcode regions from said clutter-free, down-sampled image;

applying a connected components feature extraction algorithm to detect connected components within said barcode regions; and applying a barcode clustering algorithm which utilizes said connected components as inputs, and groups collinear components into barcode blocks.

20. A method of accurately detecting barcode locations as recited in claim 19 wherein said scanned document is a shipping label.

21. A method of accurately detecting barcode locations as recited in claim 19 wherein said accurate barcode reading is performed at a throughput of greater than 16 documents per second.

22. A method of locating a barcode from an input stage comprising the step of:

updating a hypothesized barcode block by merging connected components into said hypothesized barcode block.

23. A method of locating a barcode from an input stage as recited in claim 22 wherein a component is merged into said hypothesized barcode block only if:

(a) a difference between a barcode axis angle of said component and a barcode axis angle of a hypothesized barcode block is less than a first threshold value;

(b) a shortest distance between said component and said hypothesized barcode block is less than a second threshold value; and (c) a perpendicular distance from a centroid of said component to a barcode axis of said hypothesized barcode block is less than a third threshold value.

24. A method of locating a barcode from an input stage as recited in claim 22 wherein the height of said hypothesized barcode block is predetermined.

25. A method of locating a barcode from an input stage as recited in claim 24 wherein the length of said hypothesized barcode block is updated to include all connected components.

26. A method of locating a barcode from an input stage as recited in claim 22 wherein the length of said hypothesized barcode block determines the length of said barcode.

27. A method of locating a barcode from an input stage as recited in claim 22 wherein when said updating step is completed, four corner points are determined for said hypothesized barcode block, and said four corner points represent a location boundary for said barcode.

* * * * *